Figure 1:
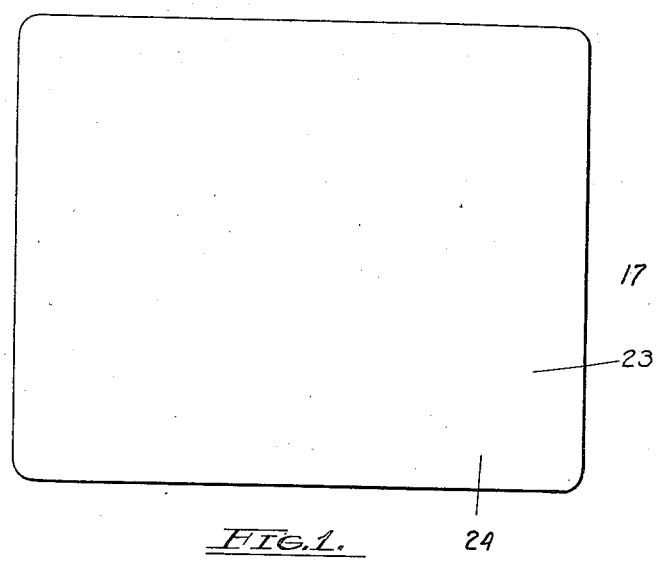

D. B. PERKINS.
RAZOR BLADE SHARPENER.
APPLICATION FILED OCT. 20, 1919.

1,392,701.

Patented Oct. 4, 1921.
6 SHEETS—SHEET 1.

INVENTOR.
Daniel B. Perkins
By Horatio E. Bellows
ATTORNEY.

D. B. PERKINS.
RAZOR BLADE SHARPENER.
APPLICATION FILED OCT. 20, 1919.

1,392,701.
Patented Oct. 4, 1921.
6 SHEETS—SHEET 2.

INVENTOR.
Daniel B. Perkins
By Horatio E. Bellows
ATTORNEY.

D. B. PERKINS.
RAZOR BLADE SHARPENER.
APPLICATION FILED OCT. 20, 1919.

1,392,701.

Patented Oct. 4, 1921.
6 SHEETS—SHEET 3.

INVENTOR
Daniel B. Perkins
By Horatio E. Bellows
ATTORNEY

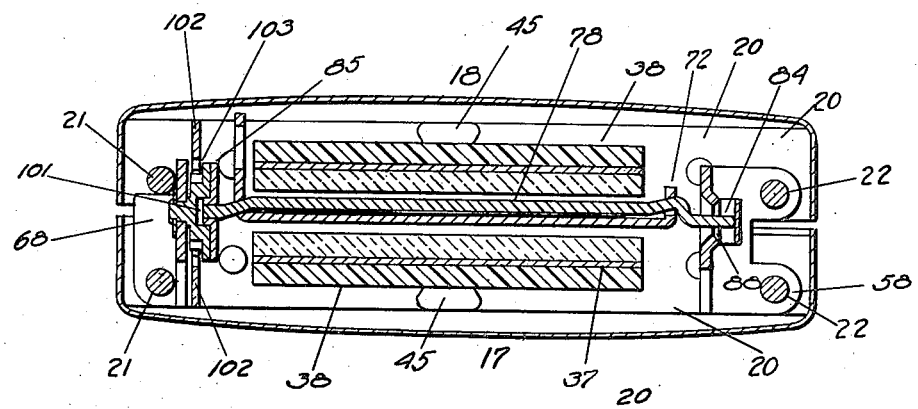
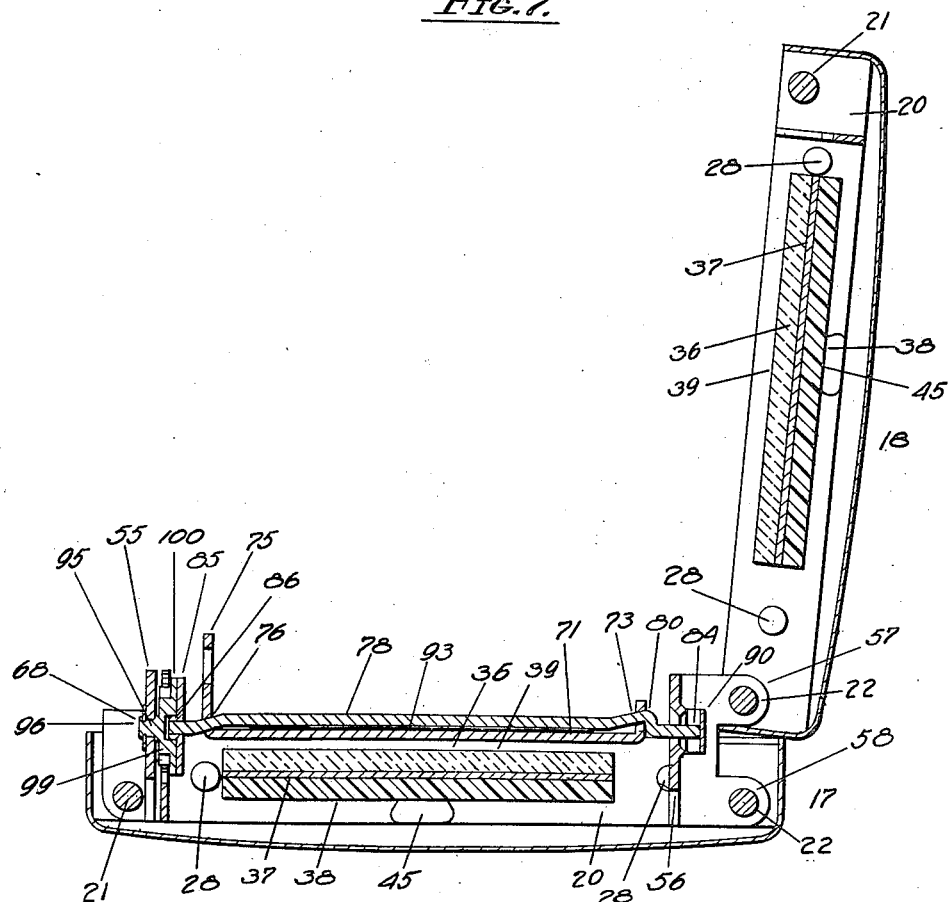

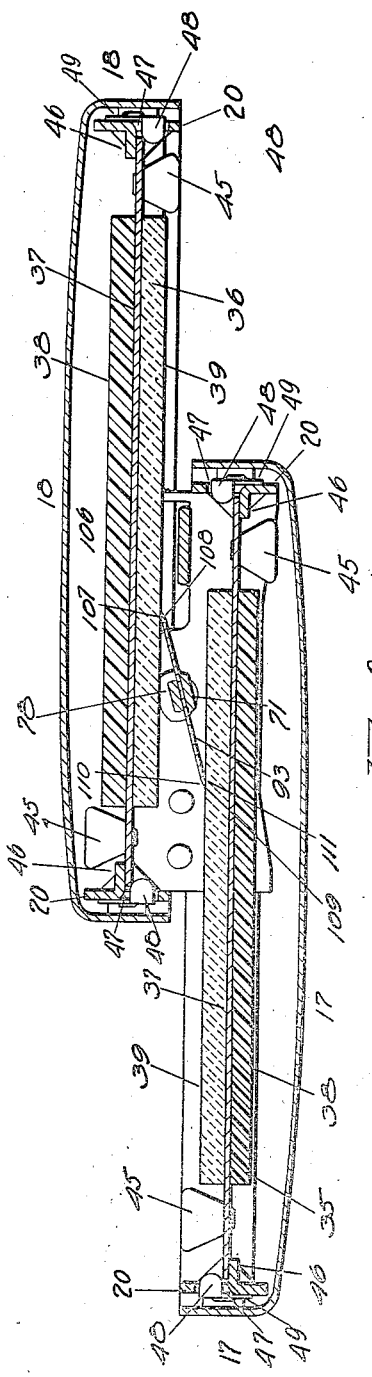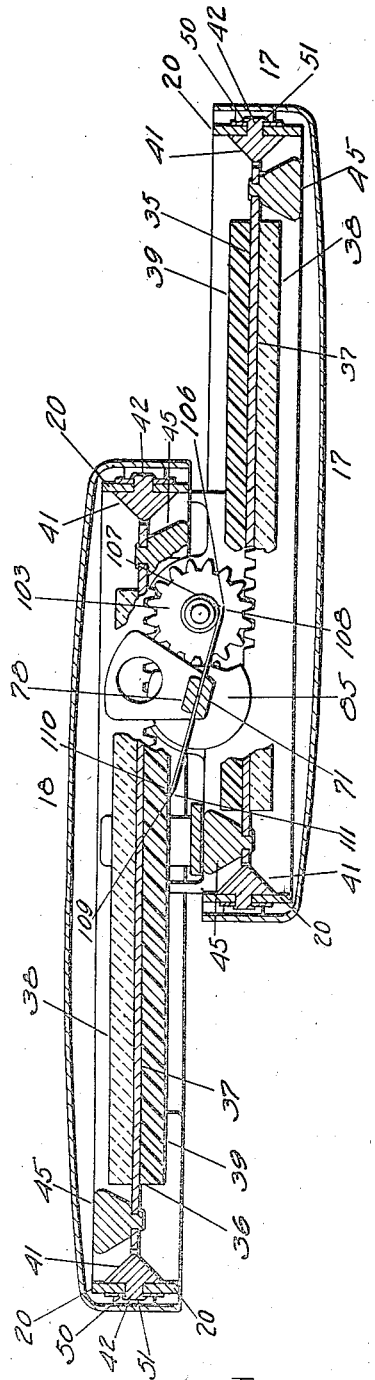

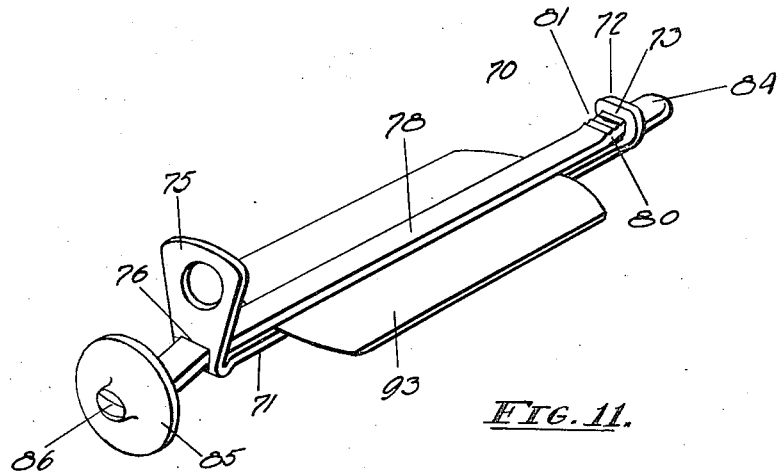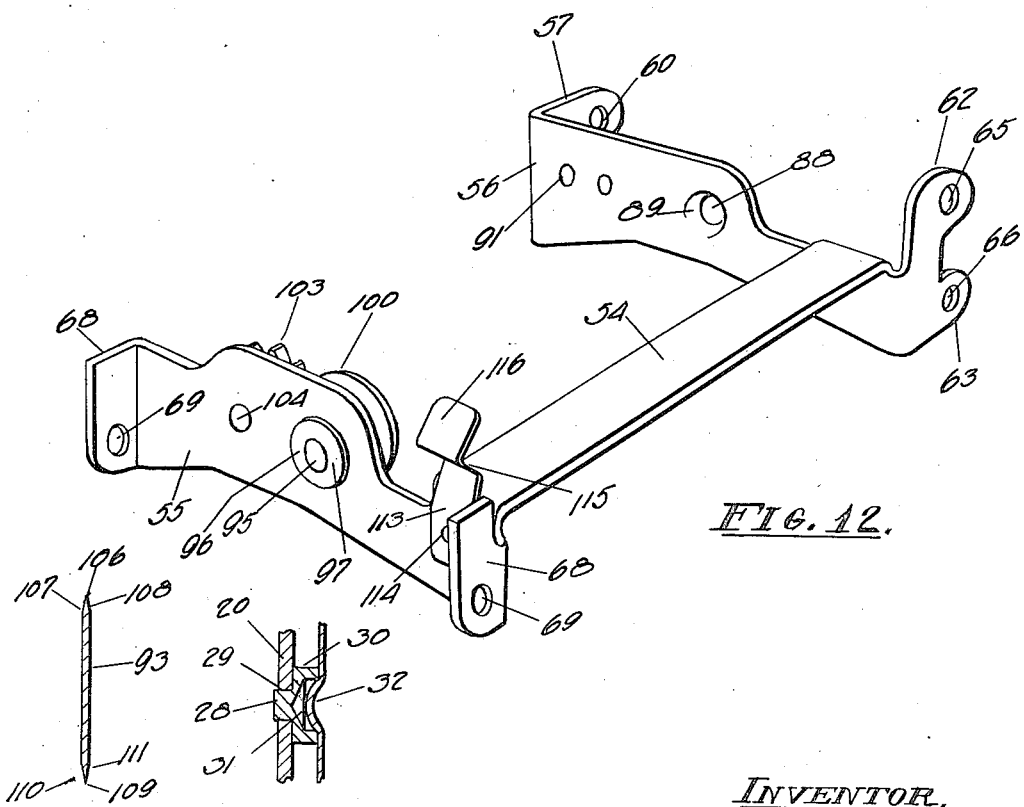

UNITED STATES PATENT OFFICE.

DANIEL B. PERKINS, OF PROVIDENCE, RHODE ISLAND.

RAZOR-BLADE SHARPENER.

1,392,701.

Specification of Letters Patent.

Patented Oct. 4, 1921.

Application filed October 20, 1919. Serial No. 332,110.

*To all whom it may concern:*

Be it known that I, DANIEL B. PERKINS, a citizen of the United States, residing at Providence, in the county of Providence and State of Rhode Island, have invented certain new and useful Improvements in Razor-Blade Sharpeners, of which the following is a specification.

My invention relates to devices for sharpening single or double edge safety razor blades and ordinary or other types of razor blades.

The usual safety razor blades have two cutting edges, each edge comprising two converging beveled faces. Heretofore non-rotary sharpeners have been adapted to automatically hone or strop only one edge, or the two opposite faces of one edge, by a single cycle of reciprocations. To sharpen the faces of the other edge required manual reversing or disassembling and reassembling the constituent parts.

It has been attempted to attain this result by sharpeners of the rotary type wherein a tilting holder presents the blade faces to rotary abrasive members. This was ineffective because the periphery of a circular member being curved, acting upon the plane face of the blade, tends to groove the blade adjacent the edge rather than plane and sharpen it.

The essential objects of my invention are to successfully sharpen all four faces of the blade by a single cycle of reciprocations, and without reversal or reassembling of the elements carrying the abrasive members; to permit simultaneous manual reciprocation of both slides in opposite directions free of any support for the device and by motions natural to the operator; to determine the length of stroke at will; to increase the speed of the sharpening operation; to avoid the disadvantages of cylindrical abrasive members; to afford accessibility to the blade holder without detachment of any part of the structure; to enable both stropping and honing, or simultaneous stropping and honing; and to make the device sightly, portable, compact, and self contained. Further objects of my invention will appear from an examination of the drawings and the following description.

My invention consists in mounting the members which carry the abrasive elements in both slidable and pivotal relation to each other; also in both slidable and pivotal relation to the blade holder; in locating the blade holder for simultaneous contact with two independent plane abrasive surfaces; and in such parts and combinations of parts as fall within the scope of the appended claims.

In the accompanying drawings which form a part of this specification, and which illustrate the principles of this invention and the best mode now known to me of applying those principles.

Figure 2:
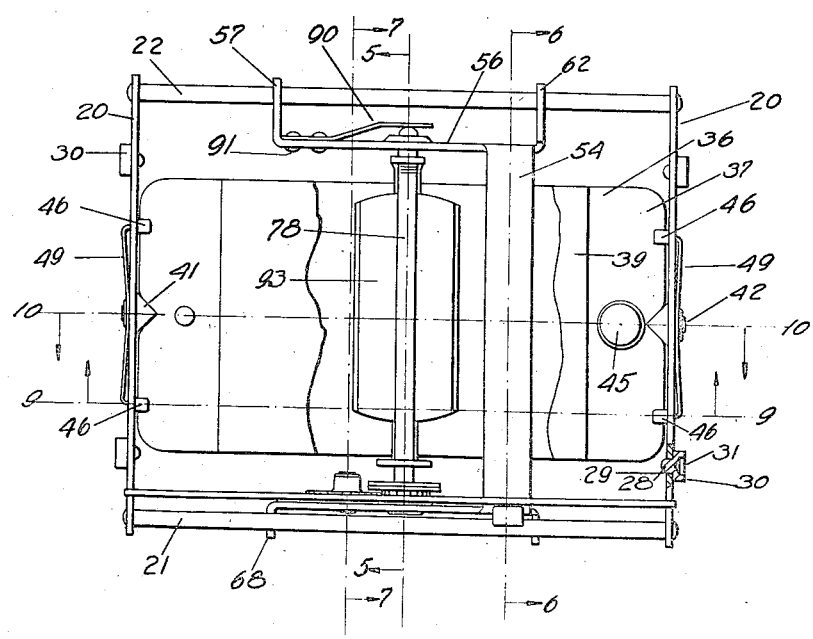
Figure 3:
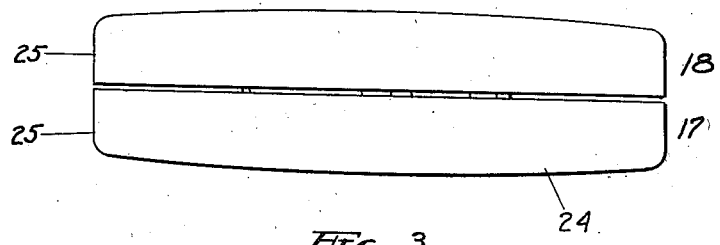
Figure 4:
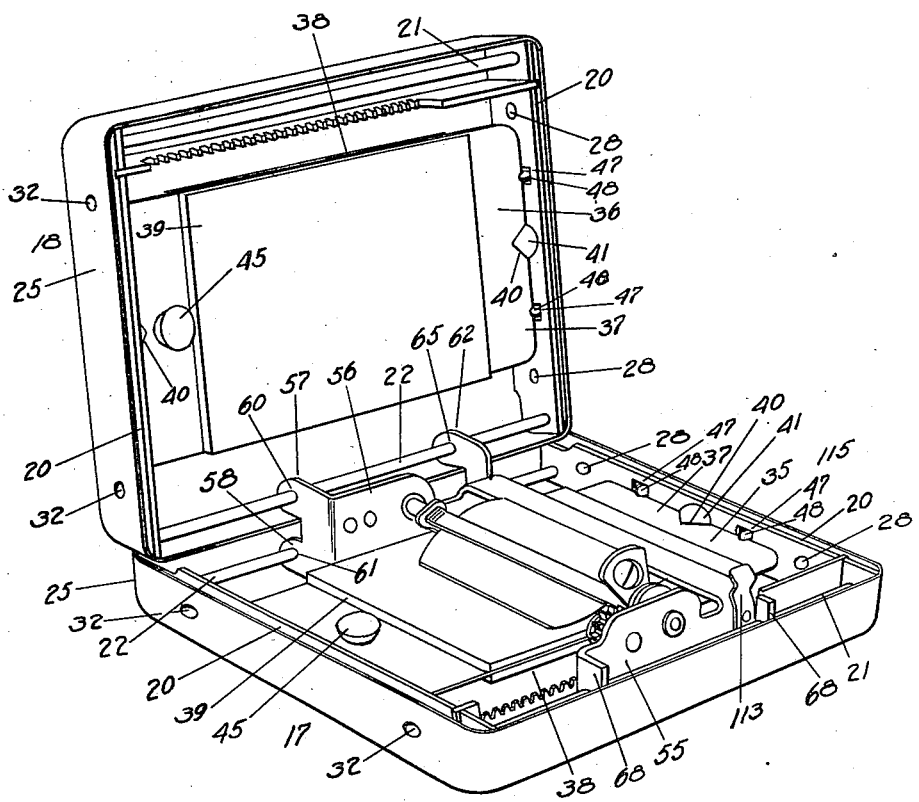
Figure 5:
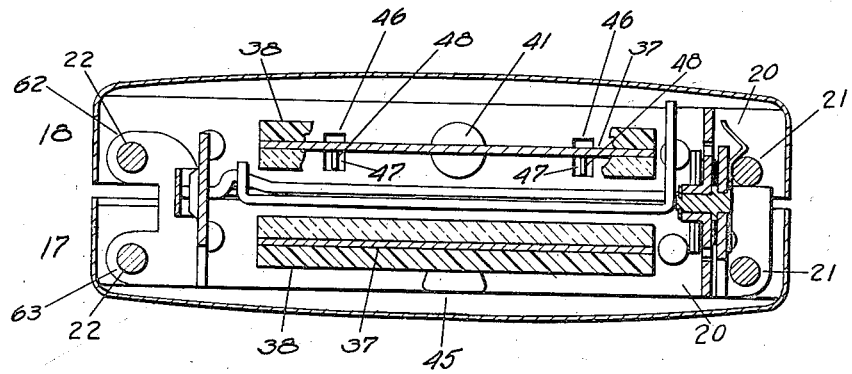
Figure 6:
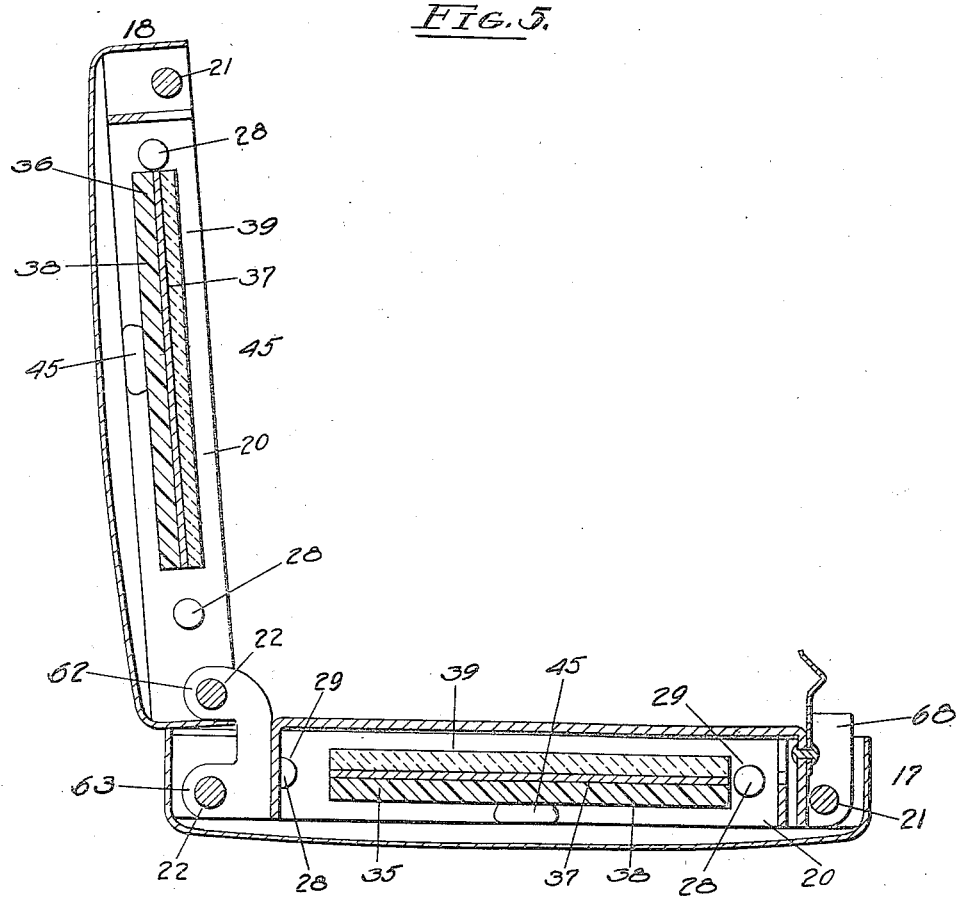

Figure 1 is a side elevation of my sharpener closed,

Fig. 2, a like elevation of the same with the shell removed and a portion of the abrasive member broken away, Fig. 3, a plan of the same, Fig. 4, a perspective view of the sharpener open, Figs. 5 and 6, sections on line 5—5 and 6—6 respectively of Fig. 2 of the sharpener in closed and open positions respectively, parts in Fig. 5 being shown broken away, Figs. 7 and 8, sections on line 7—7 of Fig. 2 of the same in closed and open positions respectively, Figs. 9 and 10 sections on line 9—9 and 10—10 respectively of Fig. 2 showing the slides distended to their limits in opposite directions, Figs. 11 and 12 detail views of the blade holder and the carriage respectively, Fig. 13, a transverse section of a razor blade, and Fig. 14, a section of a shell engaging member on line 14—14 of Fig. 6.

Like reference characters indicate like parts throughout the views.

My razor blade sharpener comprises two reciprocable blocks or frames of similar construction indicated in a general way by 17 and 18. These frames may be of any construction, either solid or open, adapted to carry abrasive elements. In the form thereof herein illustrated each frame comprises flat end bars 20 connected near their ends by cylindrical longitudinally disposed outer and inner marginal guide rods 21 and 22. In this instance the guide rods are constituent parts of the frames but this is not essential. Detachable shells 23 comprising rectangular bodies 24 with rounded corners, and peripheral flanges 25 frictionally embrace and house the frames, but these may be omitted. In this case the rounded corners of the flanges contact with the ends of the bars 20, and the remaining portions of the flanges are slightly spaced from the frame. When present the shells are sufficiently loose to allow their manual withdrawal to permit substitution of shells of different material and ornamentation. Auxiliary shell attaching means are shown in Fig. 14 consisting of studs comprising reduced portions 28 fast in openings 29 in the bars 20, or integral therewith, and enlarged portions 30 provided with cavities 31 in which register rounded indents 32 upon the flanges 25.

Detachably mounted in the frames are reversible abrasive or sharpening elements 35 and 36 of identical construction. Each element comprises a plate 37 having fastened to one face by cement or otherwise a slab 38 of hard abrasive material constituting a hone, and fast to the other side a stropping strip or pad 39 of leather or other less abrasive material. In the center of both ends of the plates are V shaped centering notches 40 adapted to receive conical projections or studs 41 provided with shanks 42 fast in the bars 20. Upon the faces of each plate 37, in diametrically opposite margins, are projecting knobs 45 to be grasped by the fingers in withdrawing the plates 37. The ends of each plate abut against lugs or lips 46 on the bars 20, adjacent which are openings 47 through which extend rounded fingers 48 upon the ends of flat springs 49 fastened to the bars 20 by the shanks 42 of the studs 41 which pass through central openings 50 in the springs and are riveted over the latter as at 51. The fingers 48 yield to admit the plates 37 to the lugs 46 which constitute seats therefor and then return over the plates and hold them against the lugs. When the plates 37 are pressed against the fingers 48 the latter yield to admit the former to the lugs, and then snap back and temporarily lock the plates in place. The plates are released by withdrawing them. The knobs 45 may be utilized in the described manipulation of the plates. The reversibility of the latter enable the exposure of either the hones 38, or the strops 39.

The frames are interengaged in such a manner as to be both pivoted and longitudinally reciprocable relatively to each other. This interengagement is through a hinge plate forming a constituent part of a carriage. In detail the carriage comprises a flat cross bar 54 integral with whose ends are longitudinally disposed plates 55 and 56. Upon one end of the plate 56 are laterally extending spaced ears 57 and 58 provided respectively with openings 60 and 61. Similar spaced ears 62 and 63, with perforations 65 and 66 respectively, are integral with the other end of the plate. The ears 57 and 62 are in horizontal alinement with each other at one side of the longitudinal center of the plate 56, and the ears 58 and 63 are in similar alinement at the other side of said center. The guide rod 22 of the frame 18 is slidable in the perforations of the ears 57 and 62, while the rod 22 of the opposite frame is loose in the perforations of the ears 58 and 63. The plate 55 has lateral end ears 68 provided with perforations 69 through which loosely passes the guide rod 21 of the frame 17. It will be noted that the ears 57 and 62 coöperate with the bars 20 of the frame 18 to form stops for the latter in both directions of its reciprocation. The ears 58, 63, and 68 perform a like office for the frame 17.

The described carriage serves as a carrier for an oscillatory blade holder represented in a general way by 70. In detail the holder comprises a flat clamping bar 71 with a vertical lip 72 upon one end provided with a rectangular opening 73 forming a loop. Upon its other end is an upturned finger piece 75 provided with a rectangular opening 76. A second flat bar 78 engageable with the bar 71 slidably passes through the openings 73 and 76 and has near one end an inclined shoulder 80 normally engaged by the loop 72. The inclined face of the shoulder has preferably a series of transverse serrations 81. The bar 78 is extended beyond the shoulder and has its extremity curved to form a journaling end portion 84. Fast to the other end of the bar 78 is a disk 85 with a central hub or projection 86. The end 84 of the bar 78 is loose in an opening 88 in the plate 56 having a beveled entrance 89, and its extremity is pressed by a flat spring 90 fastened by rivets 91 in one end to the plate 56. Between the bars 71 and 78 may be clamped a razor blade 93. To separate the bars, the member 75 is manually drawn toward the disk 85 and moves the loop 72 from the shoulder 80. After insertion of the blade, clamping plate 71 is pushed in the opposite direction to force the shoulder into tight engagement with the loop. Journaled in the plate 55 in alinement with the bar 78 is a shaft or pin 95 having on its outer end a head 96 engaging a washer 97. Fast to the pin 95 is a pinion 99, and integral with the pinion and pin is a friction disk 100 adapted to engage the face of the friction disk 85 and provided with a central recess 101 adapted to receive the hub 86 of the latter. Pressure on the member 75 toward the spring 90 removes the projection 86 from its seat and allows complete withdrawal of the members 71 and 78 from the carriage. In operation the bar 78 and pin 95 constitute the sections of a divided rock shaft.

The mechanism for reciprocating the pinion 99 is as follows. Fast in bars 20 of each frame, parallel with and adjacent the bars 21, are racks 102. The rack in the frame 17 is adjacent the carriage wall 55 and engages a driving pinion 103 mounted on a pin 104 in the wall. The pinions intermesh, and when the frames are closed both racks engage the pinion 103, as shown in Fig. 7, and the rod 21 of the member 18 slidably rests on the ears 68. In closed position the frames are grasped by both hands, preferably in vertical planes, and simultaneously reciprocated in opposite directions. In Figs. 9 and 10 the parts are shown in positions of extreme travel. In Fig. 13 a typical razor blade 93 is shown with one edge 106 formed by inclined or beveled faces 107 and 108, and the other edge 109 forming the apex of similar faces 110 and 111. At the beginning of each reciprocation the pinion 103, through the driven pinion 99, tilts the blade holder to a certain incline which brings the two blade faces 107 and 111 of the two edges into contact with the two abrasive elements 38, as shown in Fig. 9; and in this position the holder remains throughout the period of travel of the frames. The beginning of the reverse movement of the frames in like manner tilts the holder bringing the faces 108 and 110 of the edges into contact with the abrasive elements 38 where the blade is maintained during the remainder of the reverse travel. The reason that after the initial tilt of the blade holder no further rotary movement thereof occurs during the remaining period of the travel is because during this period the pinion 99 rotates as an idler by virtue of the continued rotation of the disk 100 over the face of the disk 85 with only sufficient friction thereon to maintain the blade in contact with the two abrasive elements. By virtue of this pinion and disk construction it is also possible to reverse the directions of the frames at any period of their travel less than their extreme positions, thus controlling the length of stroke at will.

The pressure of the operator's hands is sufficient to keep the frames closed during the sharpening operation, but for convenience in transportation means may be employed for maintaining the frames closed. In this instance such means consists of a catch comprising a resilient post 113 of thin metal, fastened to the wall 55 by a rivet 114, and having a transverse outwardly directed inclined shoulder 115 and inwardly directed inclined lip 116. In closing the rod 21 of the frame 18 slides on the lip 116 to a position below the shoulder 115. In this position the rod is held by the elasticity of the catch, but the friction is not sufficiently great to interfere with the reciprocation of the frames.

It is to be understood that the invention is not limited to the specific form herein illustrated and described, but may be embodied in other forms without departure from its spirit as defined by the following claims.

It will be further understood that while this machine is particularly adapted for honing and stropping safety razor blades its use is not intended to be limited to razor blades of the safety type.

I claim:—

1. In a safety razor blade sharpener, opposed frames longitudinally reciprocable relatively to each other, a carriage interposed between said frames and on which the latter are mounted, relatively flat sharpening elements fixed to move with said frames, a blade holder mounted in the carriage to hold a blade between said elements, and means for automatically oscillating said holder during reciprocation of the frames.

2. In a safety razor blade sharpener, opposed frames longitudinally reciprocable relatively to each other, a carriage interposed between said frames and on which the latter are mounted, relatively flat sharpening elements fixed to move with said frames, a blade holder mounted in the carriage to hold a blade between said elements, and means for automatically oscillating said holder during reciprocation of the frames, said frames inclosing the carriage and holder.

3. In a safety razor blade sharpener, a carriage, frames oppositely reciprocable relatively to each other mounted in said carriage one upon each side thereof, one of said frames being manually movable relatively to and over the other; plane non-rotatable separate sharpening elements carried by said frames, a blade holder mounted in the carriage transversely of the direction of the movement of the frames, and means for oscillating the blade holder by the reciprocation of the frames.

4. In a razor blade sharpener, a carriage, oppositely reciprocable frames slidably engageable with opposite sides of the carriage, plane abrasive elements in the frames, racks on the frames, a driving pinion on the carriage engaging the racks, and an oscillatory blade holder operable by said pinion and comprising a shaft pivotally supported in the carriage disposed transversely of the racks intermediate the abrasive elements.

5. In a razor blade sharpener, a carriage, a blade holder on the carriage, frames slidably mounted on both sides of the carriage, abrasive elements in the frames adjacent the blade holder, and shells inclosing the frames, the carriage, and the blade holder.

6. In a razor blade sharpener, a carriage, an oscillatory blade holder pivotally mounted in the carriage, bodily reciprocable frames on opposite sides of the carriage, abrasive elements in the frames coöperating with the blade holder, and means operated by the frames for actuating the blade holder.

7. In a razor blade sharpener, a carriage, oppositely reciprocable frames slidably engageable with opposite sides of the carriage, plane abrasive elements in the frames, racks on the frames, a driving pinion on the carriage engaging the racks, and an oscillatory blade holder comprising a shaft pivotally supported in the carriage disposed transversely of the racks intermediate the abrasive elements, and a pinion on the shaft engaging the driving pinion.

8. In a razor blade sharpener, a carriage, frames slidably mounted on opposite sides of the carriage, abrasive elements in the frames, racks in the frames, a driving pinion on the carriage adapted to mesh with the racks, a shaft in the carriage, a friction disk on the shaft provided with a cavity, a pinion on the shaft engaging the driving pinion, a blade holder comprising a bar having one end rotatably mounted in the carriage adjacent the abrasive elements, a friction disk fast to the bar, a projection on the second disk loose in the cavity, and a spring on the carriage engaging the end of the bar to press the disks together.

9. In a razor blade sharpener, a carriage, a blade holder on the carriage, frames slidably mounted on both sides of the carriage, abrasive elements in the frames adjacent the blade holder, and shells detachably fitting the frames and inclosing the frames, the carriage, and the blade holder.

10. In a razor blade sharpener, a carriage, frames slidably mounted on both sides of the carrier, opposed non-rotatable sharpening elements in the frames, studs in the sides of the frame provided with cavities, a blade holder mounted in said carriage, shells inclosing the frames, and indents in the shells registering in the cavities.

11. In a razor blade sharpener, a carriage, an oscillatory blade holder in the carriage, frames slidably mounted on opposite sides of the carriage and inclosing the carriage, plane abrasive elements detachably mounted in the frames, and means operable by the movement of the frames for oscillating the blade holder.

12. In a razor blade sharpener, a carriage, the reciprocatory frames comprising end bars, and guide rods slidably mounted in the carriage, said end bars being provided with spaced openings, lugs on the bars adjacent the openings, flat springs fast to the sides of the end bars opposite the lugs and intermediate the openings, fingers on the springs extending through the openings, sharpening elements non-rotatably mounted in said frames retained in place by said lugs and fingers, an oscillatory blade holder pivotally mounted in the carriage intermediate the elements, and means actuated by the frames for oscillating the blade holder.

13. In a razor blade sharpener, a carriage, reciprocatory frames comprising end bars, and guide rods slidably mounted in the carriage at opposite sides thereof, an oscillatory blade holder pivotally mounted on the carriage between the frames, seats on the end bars, centering points on the bars between the seats, plates resting on the seats and provided with cavities adapted to receive the centering points, relatively flat sharpening elements carried by said plate and opposed to each other upon opposite sides of said blade holder.

14. In a razor blade sharpener, a pair of reciprocable frames each comprising a pair of end bars, an outer connecting guide rod, and an inner connecting guide rod, a carriage between the frames and disposed transversely thereof provided with holes in one end to slidably receive the inner guide rods, and provided in its other end with holes adapted to slidably receive one of the outer rods, the other outer rod resting on the carriage, a catch on the carriage adapted to engage the last mentioned rod, an oscillatory blade holder pivotally mounted in the carriage, and means actuated by the frames for operating the blade holder.

15. In a razor blade sharpener, a pair of frames pivotally and longitudinally reciprocable relatively to each other, a carriage having a member forming a constituent part thereof and connecting the frames, an oscillatory blade holder mounted in the carriage, abrasive elements in the frames coöperating with the blade holder, and means whereby the blade holder is actuated by said frames.

In testimony whereof I affix my signature.

DANIEL B. PERKINS.